US011455141B2

(12) United States Patent
DeCastro et al.

(10) Patent No.: US 11,455,141 B2
(45) Date of Patent: Sep. 27, 2022

(54) LOCATION-ENABLED PORTABLE AUDIO SYSTEM

(71) Applicant: BUSHNELL INC., Overland Park, KS (US)

(72) Inventors: John DeCastro, Overland Park, KS (US); Scott O. Nyhart, Shawnee, KS (US); William Flood, Olathe, KS (US)

(73) Assignee: BUSHNELL INC., Overland Park, KS (US)

( * ) Notice: Subject to any disclaimer, the term of this patent is extended or adjusted under 35 U.S.C. 154(b) by 0 days.

(21) Appl. No.: 16/679,633

(22) Filed: Nov. 11, 2019

(65) Prior Publication Data

US 2021/0141588 A1     May 13, 2021

(51) Int. Cl.
*G06F 3/16* (2006.01)
*H04R 1/02* (2006.01)
(Continued)

(52) U.S. Cl.
CPC .......... *G06F 3/165* (2013.01); *A63B 71/0622* (2013.01); *H02J 7/025* (2013.01); *H04R 1/025* (2013.01); *H04R 1/026* (2013.01); *H04R 3/00* (2013.01); *A63B 2071/0625* (2013.01); *A63B 2102/32* (2015.10); *A63B 2209/08* (2013.01); *A63B 2220/12* (2013.01); *A63B 2220/20* (2013.01); *A63B 2225/54* (2013.01); *H04R 2420/07* (2013.01); *H04R 2499/11* (2013.01)

(58) Field of Classification Search
CPC . A63B 71/0669; A63B 69/36; A63B 71/0622; A63B 2102/32; A63B 2071/0625; A63B 2209/08; A63B 2220/12; A63B 2220/20; A63B 2225/54; B01L 9/00; G06F 3/165; H02J 7/025; H02J 50/40; H04R 1/025; H04R 1/026; H04R 3/00; H04R 2420/07; H04R 2499/11
See application file for complete search history.

(56) References Cited

U.S. PATENT DOCUMENTS 5,996,116 A * 12/1999 Tate ........................ A01K 97/06
                                                              2/12
6,170,088 B1 * 1/2001 Tate ........................ A63B 57/50
                                                              2/209.13
(Continued)

FOREIGN PATENT DOCUMENTS

KR        100959346 B1 *  5/2010
KR        100959346 B1 *  5/2010
(Continued)

*Primary Examiner* — Matthew A Eason
*Assistant Examiner* — Kuassi A Ganmavo
(74) *Attorney, Agent, or Firm* — Walter M. Egbert, III; Richard J. Brown; Reed Smith LLP

(57) ABSTRACT

Audio systems and methods for obtaining location information are disclosed. A portable, wireless speaker that may include a beacon that a user may activate to remotely trigger a request for shot information, which may include location information of the user or speaker. The beacon may be wirelessly coupled to the speaker. The speaker may receive location information from a remote device, such as a GPS-enabled mobile phone. The shot information may be converted into an audio format for playback by the speaker. The speaker may pause the playback of the speaker to play out the shot information.

17 Claims, 3 Drawing Sheets

(51) Int. Cl.
  *H04R 3/00*    (2006.01)
  *H02J 7/02*    (2016.01)
  *A63B 71/06*   (2006.01)
  *A63B 102/32*  (2015.01)

(56) References Cited

U.S. PATENT DOCUMENTS

| | | | | |
|---|---|---|---|---|
| 2002/0052750 A1* | 5/2002 | Hirooka | ................ | G06Q 30/02 |
| | | | | 705/26.1 |
| 2006/0270450 A1* | 11/2006 | Garratt | ................ | G16H 20/30 |
| | | | | 455/556.1 |
| 2008/0235026 A1* | 9/2008 | Garratt | ................ | G10L 13/00 |
| | | | | 704/270 |
| 2010/0225270 A1* | 9/2010 | Jacobs | ................ | H02J 50/12 |
| | | | | 320/108 |
| 2011/0077093 A1* | 3/2011 | Garratt | ............... | A63B 69/3658 |
| | | | | 473/131 |
| 2011/0088143 A1* | 4/2011 | Lee | ................ | A42B 1/245 |
| | | | | 2/209.13 |
| 2012/0023152 A1* | 1/2012 | Felt | ................ | A63B 71/06 |
| | | | | 709/203 |
| 2013/0129134 A1* | 5/2013 | Parraga Gimeno | ...... | H04R 1/02 |
| | | | | 381/338 |
| 2013/0178311 A1* | 7/2013 | Peterson | ................ | G01C 17/02 |
| | | | | 473/406 |
| 2014/0376737 A1* | 12/2014 | Goldman | ................ | H04R 3/12 |
| | | | | 381/80 |
| 2017/0348580 A1* | 12/2017 | Dugan | ................ | A63B 69/36 |
| 2018/0035205 A1* | 2/2018 | Vautin | ................ | H03G 3/3026 |
| 2018/0341643 A1* | 11/2018 | Alders | ................ | G10L 15/1822 |
| 2018/0345101 A1* | 12/2018 | Youn | ................ | A63B 57/35 |
| 2020/0221198 A1* | 7/2020 | Pupecki | ................ | H05K 1/189 |

FOREIGN PATENT DOCUMENTS

| | | | |
|---|---|---|---|
| KR | 101877285 B1 | * | 7/2018 |
| KR | 20180104366 A | * | 9/2018 |

* cited by examiner

LOCATION-ENABLED PORTABLE AUDIO SYSTEM

FIELD OF TECHNOLOGY

Aspects of the present disclosure relate to a system for audio playback, more specifically a system for controlling and generating audio playback including a remote positioning and location functionality.

BACKGROUND

In certain sporting activities, knowledge of a player's location and range to a target can provide the player with a distinct playing advantage. Golfers, for example, have relied on traditional range finding devices to determine the distance from the golfer's position to the green or flag stick. Knowing this distance allows the golfer to choose an appropriate club or determine the speed or strength required to hit the ball. Traditional ranging devices may include an optical device coupled to a laser transmitter and receiver, that when aimed and fired at a target, transmits a beam toward the target, receives a reflected beam to the receiver and calculates the distance from the device to the target based on the time-of-flight of the beam. These devices can be cumbersome, heavy and inaccurate given an obstructed field-of-view or other interference.

Golfers and other sports enthusiasts also may enjoy listening to music or other audio content while playing. Portable, wireless speakers known in the art allow a player to carry the speaker in a bag, golf cart or other vehicle. When using in a sport like golf, however, traditional portable speakers must be left in the golf bag or in the cart when the golfer steps away from the bag or cart to take a shot. The golfer no longer has immediate access to the controls on the speaker requiring the golfer to return to the bag or cart to pause, stop, or otherwise control it.

SUMMARY

Embodiments of the present invention include a portable audio system for control and playback of audio content, including certain information relating to a user's location, environment and other personalized content. According to one aspect, an audio playback system may include a beacon configured to trigger a request for shot information and a controller wirelessly coupled to the beacon. The controller may be configured to transmit the request for shot information to a remote device and receive the shot information from the remote device. The shot information may be converted into an audio signal and play back the audio signal to an audio output.

According to another aspect, a method of determining shot information may include receiving a request for shot information from a wireless beacon and transmitting the request to a remote device. Shot information may be received from the remote device and encoded as an audio file. The audio file may be transmitted to an audio output.

According to another aspect of the present disclosure, an audio system may comprise a beacon configured to trigger a request for shot location and a controller wirelessly coupled to the beacon. A non-transitory, computer-readable storage medium may be in operable communication with the controller, and contain one or more programming instructions that, when executed, cause the controller to receive a request for shot information triggered from the wireless beacon and transmit the request to a remote device. Shot information may be received from the remote device and be encoded as an audio file. The audio file may be transmitted to an audio output.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The present disclosure provides audio systems and methods for obtaining a personalized information, including information relating to a user's location, environment and/or gameplay. According to one aspect, the present disclosure provides a portable, wireless speaker that includes a beacon that a user may activate remotely to trigger a request for information shot information for the user. Shot information, as used herein, may include information such as, without limitation, a user's location, environmental elements, landmarks, distances, gameplay history, ambient or crowd noises, or the like. The beacon may be wirelessly coupled to a controller, such as an application installed and running on a mobile device. According to one aspect, the controller may receive shot information from a remote device, such as a GPS-enabled location service. The shot information may be converted into an audio format for playback by the speaker. The speaker may pause, attenuate or otherwise adapt the playback of audio on the speaker to play out the shot information.

Figure 1:
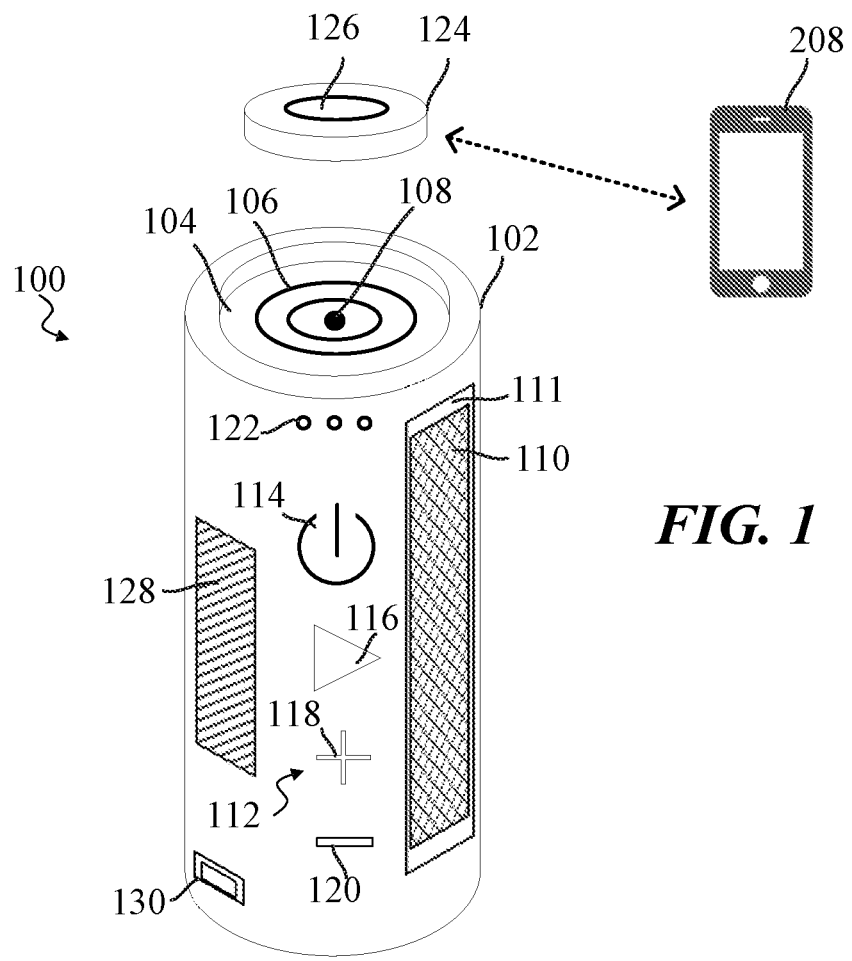
FIG. 1 depicts the components of an audio system according to an aspect of the present disclosure.

FIG. 1 depicts the components of an audio system 100 according to an aspect of the present disclosure. The audio system may include a speaker device 102 that forms or defines one or more voids 111. The audio system 100 may include one or more speakers 110 aligned with the voids 111 and configured to play back audio content stored in memory or streamed from a connected device, such as a mobile device 208. A fabric or other covering material may be disposed over the speakers 110 to prevent dust and other air-borne debris from entering the speaker 110 or speaker device 102. A power source (not shown) may provide energy to the audio system 100. The power source may be any power source commonly known in the art, including a rechargeable battery and/or an AC power connecter.

A control panel 112 may be configured to alter, adjust or otherwise control the audio play back. According to one aspect, the control panel 112 may include one or more buttons formed in or on the body, and coupled to a controller (not shown). The controller, as described herein may be software, hardware or a combination of both. According to one aspect, the controller may be a software application resident on a mobile device 208. Alternatively, the controller may reside in the speaker device 102. Control buttons may include a power button 114, a play/pause button 116, an up-volume button 118 and a down-volume button 120. The power button 114 may also function as a pairing button, establishing a paired connection with the mobile device 208 or another device. A microphone 122 may be coupled to the controller to receive voice activation commands or signals to control further the audio system. According to one aspect the speaker device 102 may include a magnetic mount 128 configured to mount the speaker device 102 securely to a metal or other magnetic material.

According to one aspect, the audio system 100 may include a beacon 124 that is coupled to the controller. The beacon 124 may be sized and shaped to fit into a recess 104 formed or defined in the speaker device 102. According to one aspect, the beacon 124 may be in the form of a poker chip-sized device suitable for carrying in the user's pocket. The speaker device 102 may include a beacon magnet 108, or magnetic material, to correspond to a magnet, or magnetic material, on the beacon 124. The beacon magnet 108 may be adapted to retain the beacon 124 in the recess 104 when the beacon 124 is not in use. According to one aspect, the speaker device 102 may further include a wireless charging interface 106 that, when the beacon 124 is placed in the recess 104, recharges a battery (not shown) in the beacon 124 using the audio system power source. The audio system 100 may also include one or more connection ports 130 configured to provide a connection to other devices. The connection ports 130 may be configured as charging ports for additional devices, AC adapter plugs, or audio input plugs.

The audio system 100 may provide audio playback from a remote device such as a mobile device 208 or other device coupled to the audio system 100. For example, the audio system 100 may be wirelessly coupled to the mobile device 208 using a Bluetooth or similar protocol. The audio system 100 and the beacon 102 may be paired with the mobile device 208 such that audio playback initiated on the mobile device 208 may be wirelessly transmitted to the audio system 100 for playback. The user may control the playback of the audio content using the control panel 112. Alternatively, the audio system 100 may include a local memory on which audio content may be stored for playback. Further yet, an audio source may be coupled to the audio system 100 using a wired connection using a connection port 130.

The audio system 100 may be portable such that it may be taken outdoors or in a vehicle. According to one aspect, outdoor enthusiasts, such as a golfer, may use the audio system 100 while out on a course playing golf. In such instances, the audio system 100 may be carried in a golf bag or in a golf cart, mounted to a metal surface of the cart using the magnetic mount 128. As described herein, the golfer may use the beacon 124 to trigger a shot information request to determine the information relating to the golfer's location, distance to a target or other gameplay information. The beacon 124 may be triggered by pressing an actuator 126, such as a button or touch pad on the beacon 124. The shot information request may be transmitted to the mobile device 208 which may determine the requested shot information and transmit such information to the audio system 100 to be played out as an audio signal from the speaker 110. The mobile device 208 may determine the shot information using any number of resources including but not limited to, geographic information, environmental information, gameplay history, or other information. Geographic information may be obtained from a GPS provider or GPS-enabled location service. Environmental information, such as course information, landmarks, distances, and other area information may be obtained from locally stored data or remote databases storing such information. Gameplay history and other information may similarly be retrieved or obtained from local or remote storage locations.

Figure 2:
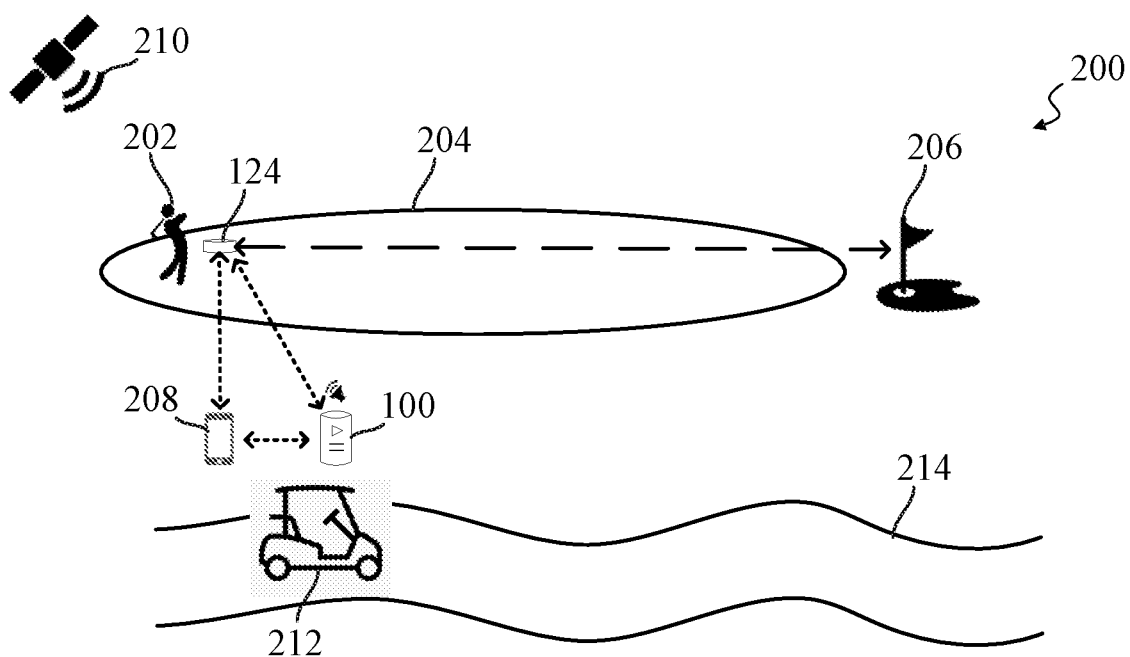
FIG. 2 depicts a usage scenario of an audio system according to an aspect of the present disclosure.

FIG. 2 depicts a usage scenario 200 of an audio system according to an aspect of the present disclosure. A golfer 202 may be playing on a course 204. According to one aspect, the golf course 204 may have published statistics and other information about the course in a database that may be accessible to the golfer 202. Such information may include hole maps, elevations, distances, and other information a golfer may desire during play. The golfer 202 may access the available course information via a website, mobile application or other source accessible by the golfer's mobile phone or other mobile device 208. The mobile device 208 may include or communicate with location services such as a global position system (GPS) or other location service that may interface with the mobile device 208 and any application or web-browser through which the golfer 202 may access course information.

According to one aspect, the golfer 202 may remove the beacon 124 from the speaker device 102 and carry the beacon 124 in a pocket such that the beacon 124 is consistently at the golfer's location and is easily accessible. For example, if the golfer is using a cart 212 and has parked the cart on a path 214, the golfer may keep the beacon 124 with him as he walks to the golf ball while the audio system remains in the cart 212, or mounted to the cart frame using the magnetic mount 128. Prior to taking a shot, the golfer 202 may wish to determine shot information, for example the distance from the golfer 202 to a target 206, such as a hole or flagstick. Knowing the distance to the target 206 allows the golfer 202 to determine more accurately an appropriate club to hit as well as the appropriate swing speed and strength. The golfer may retrieve the beacon 124 from a pocket and press the actuator 126. To avoid having to remove the beacon 124 from a pocket, the golfer may trigger the beacon 124 through the golfer's pocket by pressing the actuator 126. The beacon 124 may transmit a request to the mobile device 208. In an alternative configuration, the request may be transmitted to a controller resident on the speaker device 102.

According to one aspect of the present disclosure, the beacon 124 may trigger a listening request that may including a request for shot information. Actuating the beacon 124 may activate the microphone 122, which may be located on the speaker device 102 or the mobile device 208, and put the audio system into a listening mode, to which a golfer may issue verbal instructions, commands or requests. The verbal instructions may be processed using a voice assistant capability of the mobile device 208 or an application on the mobile device 208.

The mobile device 208 and its controller may receive the shot information request and consult the environmental information in conjunction with location information obtained by the mobile device 208, received from a GPS satellite 210 for example. The mobile device 208 may correlate the location information obtained from the GPS system or other location service with the environmental information to determine where on the course the mobile device 208 or beacon 124 are located. From the correlated location, the mobile device 208 may determine the distance from the beacon 124 or audio system 100 to the target 206. Knowing the distance to the target 206, the golfer 202 may select an appropriate club and adapt their golf swing accordingly.

The mobile device 208 may convert the shot information into an audio signal and transmit the audio signal to the audio system 100. The audio system 100 may receive the audio signal and, if already playing audio content, adapt the audio and playout the audio signal indicating the shot information, i.e., the distance to the target 206. The audio system may adapt the currently playing audio by pausing the audio, attenuating the volume of the audio content, or the like. Alternatively, the audio system may include the capability to receive and convert the shot information to an audio signal. Previously playing audio content may resume playing normally after the shot information is played out.

When the beacon 124 is not in use, the golfer 202 may replace the beacon 124 into the recess 104 of the speaker device 102, where magnetic materials may retain the beacon 124 and the battery of the beacon 124 may be recharged wirelessly by the charging interface 106. Such wireless charging systems are known in the art.

As described herein, aspects of the present disclosure provide one or more audio systems configured to broadcast, or otherwise transmit audio signals, including audio signals relating to shot information, from one or more speakers. The audio systems may include a beacon used to trigger a shot information request that is transmitted to a controller, such as a mobile phone application, or similar device. The audio system may receive the shot information from the mobile device and play such information out as audio. The audio system's functionality may be embodied, fully or in part, in a computing system.

Figure 3:
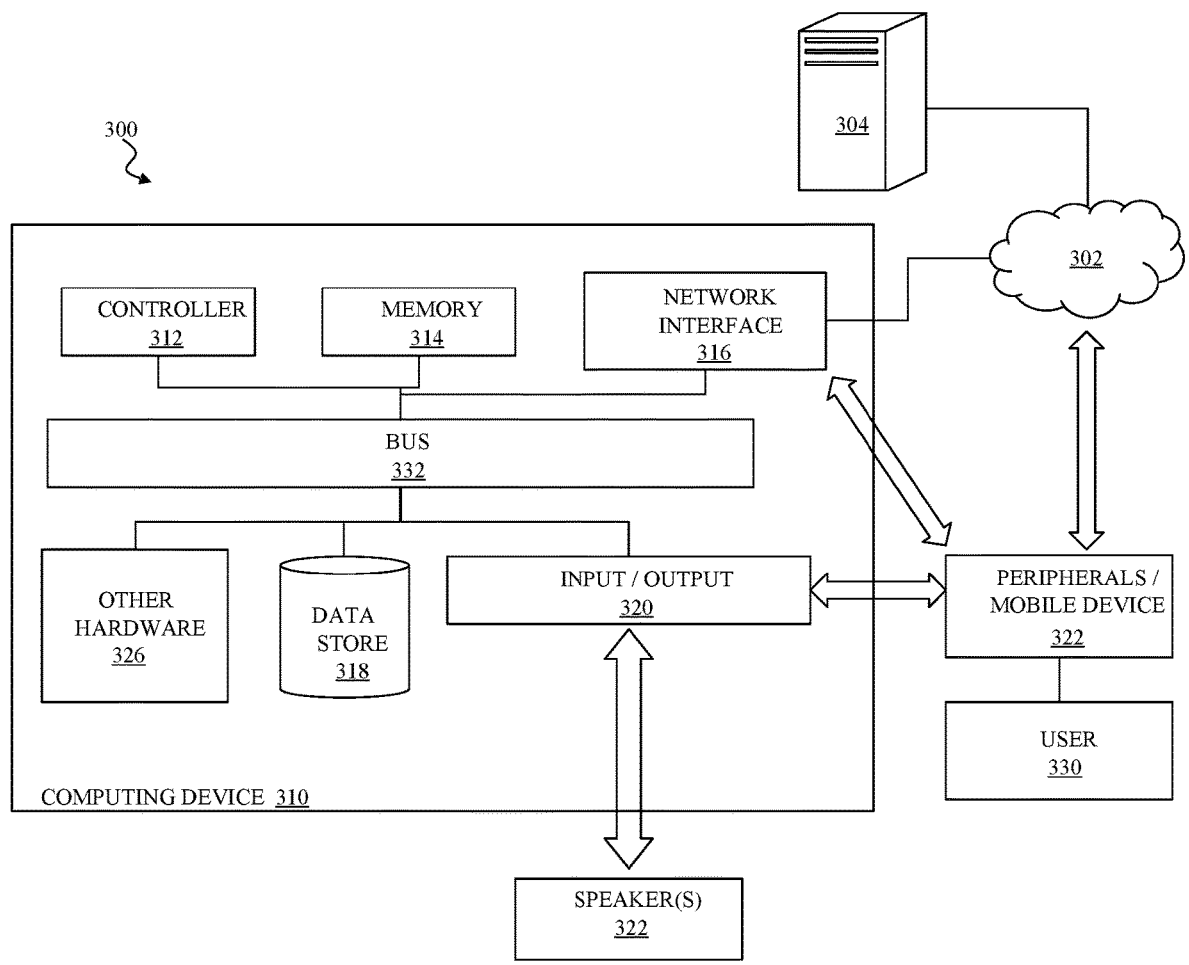
FIG. 3 depicts a hardware architecture of an audio system according to an aspect of the present disclosure.

FIG. 3 depicts a computer system 300 according to one aspect of the present disclosure. In general, the computer system 300 may include a computing device 310, such as a special-purpose computer designed and implemented for directing and controlling the output of audio signals. The computing device 310 may be or include data sources, client devices, and so forth. For example, the computing device 310 may include a microprocessor installed and disposed within an internal area a mobile device. In certain aspects, the computing device 310 may be implemented using hardware or a combination of software and hardware. The computing device 310 may be a standalone device, a device integrated into another entity or device, a platform distributed across multiple entities, or a virtualized device executing in a virtualization environment. According to one aspect, the computing device 310 may be a mobile device, such as a mobile phone, tablet, phablet, PC or the like. According to another aspect, the computing device 310 may be a speaker device.

The computing device 310 may communicate across a network 302. The network 302 may include any data network(s) or internetwork(s) suitable for communicating data and control information among participants in the computer system 300. This may include public networks such as the Internet, private networks, and telecommunications networks such as the Public Switched Telephone Network or cellular networks using cellular technology and/or other technologies, as well as any of a variety other local area networks or enterprise networks, along with any switches, routers, hubs, gateways, and the like that might be used to carry data among participants in the computer system 300. The network 302 may also include a combination of data networks and need not be limited to a strictly public or private network.

The computing device 310 may communicate with an external device 304. The external device 304 may be any computer or other remote resource that connects to the computing device 310 through the network 302. This may include any of the servers or data sources described herein, including servers, content providers, databases or other sources for shot information to be used by the devices as described herein.

In general, the computing device 310 may include a controller 312, a memory 314, a network interface 316, a data store 318, and one or more input/output interfaces 320. The computing device 310 may further include or be in communication with peripherals 322 and other external input/output devices that might connect to the input/output interfaces 320.

The controller 312 may be implemented in software, hardware or a combination of software and hardware. According to one aspect, the controller 312 may be implemented in application software running on a mobile device. Alternatively, the controller 312 may include a processor or other processing circuitry capable of processing instructions for execution within the computing device 310 or computer system 300. The controller 312, as hardware, may include a single-threaded processor, a multi-threaded processor, a multi-core processor and so forth. The controller 312 may be capable of processing instructions stored in the memory 314 or the data store 318.

The memory 314 may store information within the computing device 310. The memory 314 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 314 may store program instructions, program data, executables, and other software and data useful for controlling operation of the computing device 310 and configuring the computing device 310 to perform functions for a user. The memory 314 may include a number of different stages and types of memory for different aspects of operation of the computing device 310. For example, a processor may include on-board memory and/or cache for faster access to certain data or instructions, and a separate, main memory or the like may be included to expand memory capacity as desired. All such memory types may be a part of the memory 314 as contemplated herein.

The memory 314 may, in general, include a non-volatile computer readable medium containing computer code that, when executed by the computing device 310 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 314 is depicted, it will be understood that any number of memories may be usefully incorporated into the computing device 310.

The network interface 316 may include any hardware and/or software for connecting the computing device 310 in a communicating relationship with other resources through the network 302. This may include remote resources accessible through the Internet, as well as local resources available using short range communications protocols using, e.g., physical connections (e.g., Ethernet), radio frequency communications (e.g., Wi-Fi, Bluetooth), optical communications, (e.g., fiber optics, infrared, or the like), ultrasonic communications, or any combination of these or other media that might be used to carry data between the computing device 310 and other devices. The network interface 316 may, for example, include a router, a modem, a network card, an infrared transceiver, a radio frequency (RF) transceiver, a near field communications interface, a radio-frequency identification (RFID) tag reader, or any other data reading or writing resource or the like.

The network interface 316 may include any combination of hardware and software suitable for coupling the components of the computing device 310 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 302 such as the Internet. This may also include hardware/software for a WiMax connection or a cellular network connection (using, e.g., CDMA, GSM, LTE, or any other suitable protocol or combination of protocols). The network interface 316 may be included as part of the input/output devices 320 or vice-versa.

The data store 318 may be any internal memory store providing a computer-readable medium such as a disk drive, an optical drive, a magnetic drive, a flash drive, or other device capable of providing mass storage for the computing device 310. The data store 318 may store computer readable instructions, data structures, program modules, and other data for the computing device 310 or computer system 300 in a non-volatile form for relatively long-term, persistent storage and subsequent retrieval and use. For example, the data store 318 may store an operating system, application programs, program data, databases, files, and other program modules or other software objects and the like.

The input/output interface 320 may support input from and output to other devices that might couple to the computing device 310. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also include an infrared interface, RF interface, magnetic card reader, or other input/output system for wirelessly coupling in a communicating relationship with other local devices. It will be understood that, while the network interface 316 for network communications is described separately from the input/output interface 320 for local device communications, these two interfaces may be the same, or may share functionality, such as where a USB port is used to attach to a Wi-Fi accessory, or where an Ethernet connection is used to couple to a local network attached storage. The input/output interface 320 may further output audio signals to the speakers 322 of the audio system, as described herein.

A peripheral 322 may include any device used to provide information to or receive information from the computing device 310. This may include human input/output (I/O) devices such as a keyboard, a mouse, a mouse pad, a track ball, a joystick, a microphone, a foot pedal, a camera, a touch screen, a scanner, or other device that might be employed by the user 330 to provide input to the computing device 310. This may also or instead include a display, a printer, a projector, a headset or any other audiovisual device for presenting information to a user. The peripheral 322 may also or instead include a digital signal processing device, an actuator, or other device to support control of or communication with other devices or components. In one aspect, the peripheral 322 may serve as the network interface 316, such as with a USB device configured to provide communications via short range (e.g., Bluetooth, Wi-Fi, Infrared, RF, or the like) or long range (e.g., cellular data or WiMax) communications protocols. In another aspect, the peripheral 322 may augment operation of the computing device 310 with additional functions or features, such as a GPS device, or other device. In another aspect, the peripheral 322 may include a storage device such as a flash card, USB drive, or other solid-state device, or an optical drive, a magnetic drive, a disk drive, or other device or combination of devices suitable for bulk storage. More generally, any device or combination of devices suitable for use with the computing device 310 may be used as a peripheral 322 as contemplated herein.

Other hardware 326 may be incorporated into the computing device 310 such as a co-processor, a digital signal processing system, a math co-processor, a graphics engine, a video driver, a camera, a microphone, additional speakers, and so forth. The other hardware 326 may also or instead include expanded input/output ports, extra memory, additional drives, and so forth.

A bus 332 or combination of busses may serve as an electromechanical backbone for interconnecting components of the computing device 310 such as the controller 312, memory 314, network interface 316, other hardware 326, data store 318, and input/output interface. As shown in the figure, each of the components of the computing device 310 may be interconnected using a system bus 332 in a communicating relationship for sharing controls, commands, data, power, and so forth.

Figure 4:
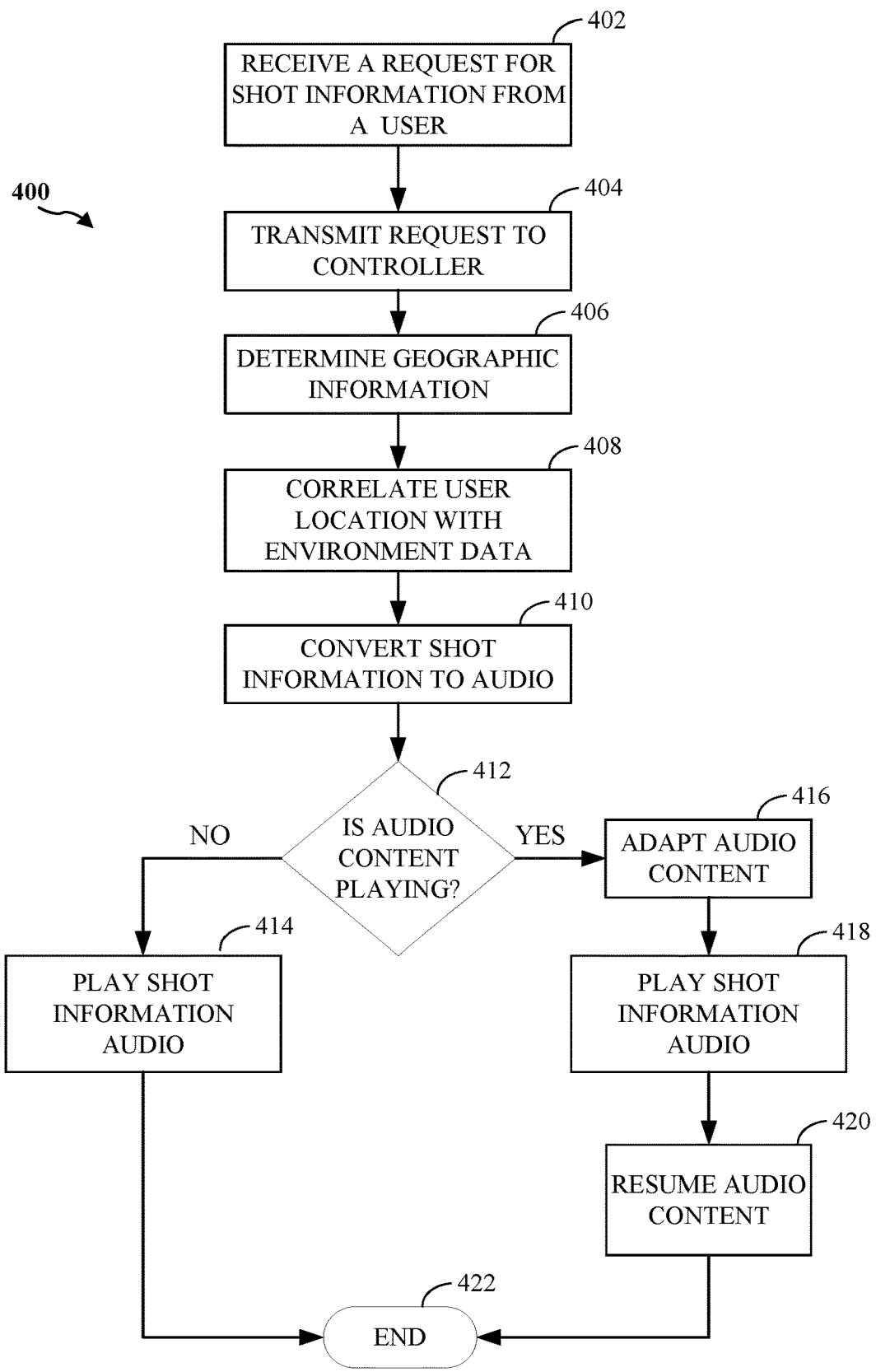
FIG. 4 depicts a method of determining a shot information according to an aspect of the present disclosure.

FIG. 4 depicts a method of obtaining shot information according to an aspect of the present disclosure. As described herein, and shown in block 402, the audio system may receive a request for shot information. A user, such as a golfer, wishing to receive information on the user's location or surrounding environmental features, may initiate the request by actuating a beacon. The beacon may be a portable and removable component of the audio system that is paired, via a wireless protocol like Bluetooth, to the audio system and/or a remote device.

As shown in block 404, the request may be transmitted to a controller on a mobile device, such as a GPS-enabled mobile device, to which the audio system is wirelessly coupled or coupled using an appropriate data transmission cable. Alternatively, the GPS-enabled mobile device may be part of the audio system itself, such as a speaker device. As shown in block 406, the controller may determine the user's geographic location using the mobile device's native GPS functionality or another location service in an installed application. Application software on the remote device may include local environmental information relating to the user's location. For example, the application software may include maps, elevations, distances, crowd sound effects, or the like relating to a golf course and or gameplay on which the user is located.

As shown in block 408, the controller, relying on the user's geographic location, may correlate the user's location with the environmental data of the application software to generate the shot information requested. The shot information may include information as to the user's location in or on a defined area, such as a golf course, various landmarks, markers, or the like. According to one aspect, the application software may include or access a database storing shot information of a number of golf courses. Based on the geographic location, the controller may determine the golf course on which the user is located. The controller may correlate the geographic location with the location information of the identified golf course to generate the shot information. The shot information may also include an elevation, distance, crowd sound effects, or other gameplay information relating to the user's location and target, such as a flagstick, bunker, or other known landmark.

As shown in block 410, the shot information may be converted into an audio signal capable of being played out by the audio system. For example, the shot information may indicate that the user is 100 yards from the flagstick of the current hole being played. The shot information, for example, may be converted to an audio signal that states "You are 100 yards from the flagstick."

As shown in block 412, the audio system may determine if audio content is already playing from the speakers when the shot information audio signal is ready to be played. If there is no audio currently being played out, the audio system may initiate the playback of the shot information audio signal, as shown in block 414. If, however, audio content is being played, the audio system may adapt the content, as shown in block 416. The controller may attenuate the volume of the current audio, pause the current audio, or the like. Once the audio content is adapted accordingly, the audio system may playback the shot information audio signal, as shown in block 418. Once the shot information is played back, as shown in block 420, the audio system may resume playback of the audio content.

As shown in block 422, the request for shot information may be completed and the audio system may continue to operate playing audio content until another request is initiated.

While aspects of the present disclosure provide for a pressure activated beacon, using a button or touch pad, one skilled in the art will recognize that other triggers may be implemented to initiate a shot information request, including voice commands.

While aspects of the present disclosure may provide functionalities and capabilities located on a remote device, one skilled in the art will recognize that those functionalities may be located, processed or otherwise carried out in the audio system itself or on another device coupled to the audio system without deviating from the scope of the disclosure.

While aspects of the present disclosure provide for an audio system to be used on a golf course by a golfer, one skilled in the art will recognize that the use and applicability of the audio system as described herein is not so limited and may be used in other environments.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. An audio playback system comprising:
    a beacon configured to trigger a request for shot information;
    a speaker device configured to removably receive the beacon and play audio content;
    a controller wirelessly coupled to the beacon and the speaker device, the controller configured to:
        transmit the request for shot information to a remote device, wherein the remote device includes a GPS-enabled location service, and the shot information comprises a geographic location of the mobile device correlated with environmental information;
        receive the shot information from the remote device;
        convert the shot information into an audio signal;
        determine whether audio content is playing from the speaker device, and if audio content is playing, adapting the audio content; and
        play back the audio signal to an audio output coupled to the speaker device.

2. The audio system of claim 1 wherein the controller includes an application stored on a mobile device.

3. The audio system of claim 1, wherein the speaker device defines a recess, the recess sized and shaped to retain the beacon.

4. The audio system of claim 3 wherein the speaker device comprises a first magnetic material disposed in the recess, the beacon including a second magnetic material configured to attract the first magnetic material.

5. The audio system of claim 1, wherein the speaker device is coupled to the audio output through a wireless connection.

6. The audio system of claim 5 wherein the wireless connection is a Bluetooth connection.

7. The audio system of claim 1, wherein the speaker device further comprises a wireless charging interface configured to charge the beacon.

8. The audio system of claim 1, wherein the speaker device further comprises a magnetic mount configured to mount the speaker device to a metal or magnetic surface.

9. The audio system of claim 1 further comprising a microphone coupled to the controller, the microphone configured to receive a voice command.

10. The audio system of claim 9 wherein the beacon is configured to activate the microphone.

11. The audio system of claim 1, wherein the beacon further comprises an actuator, the actuator configured to trigger the request for the shot information.

12. The audio system of claim 1 wherein the beacon is coupled to the controller through a Bluetooth connection.

13. The audio system of claim 1 wherein the environmental information includes data relating to at least one landmark.

14. The audio system of claim 13 wherein the shot information includes a distance between the controller and the at least one landmark.

15. The audio system of claim 1 wherein the shot information includes at least one of a distance, an environmental element, a geographic location element, a shot history, a commentary, and an applause element.

16. The audio system of claim 1 wherein adapting the audio content comprises pausing the audio content during play back of the audio signal.

17. The audio system of claim 1 wherein adapting the audio content comprises attenuating the audio content during play back of the audio signal.

* * * * *